(12) United States Patent
Otsuka et al.

(10) Patent No.: US 6,913,379 B2
(45) Date of Patent: Jul. 5, 2005

(54) CLOSED KNEADER

(75) Inventors: Toshiyuki Otsuka, Tokyo (JP); Makoto Irie, Kakogawa (JP)

(73) Assignees: Moriyama Co., Ltd., Hyogo (JP); Nihon Spindle Mfg. Co., Ltd., Hyogo (JP)

(*) Notice: Subject to any disclaimer, the term of this patent is extended or adjusted under 35 U.S.C. 154(b) by 361 days.

(21) Appl. No.: 10/112,754

(22) Filed: Apr. 2, 2002

(65) Prior Publication Data

US 2003/0185090 A1 Oct. 2, 2003

(51) Int. Cl.⁷ .................................................. B29B 7/18
(52) U.S. Cl. ...................................... 366/76.7; 366/97
(58) Field of Search ............................... 366/76.1, 76.7, 366/76.9, 77, 84, 85, 91, 97, 297–301

(56) References Cited

U.S. PATENT DOCUMENTS

| | | | | |
|---|---|---|---|---|
| 4,053,144 A | * | 10/1977 | Ellwood ........................ | 366/97 |
| 4,234,259 A | * | 11/1980 | Wiedmann et al. ............ | 366/81 |
| 4,352,568 A | * | 10/1982 | Lohr et al. ..................... | 366/84 |
| 4,416,544 A | * | 11/1983 | Blach ............................ | 366/85 |
| 4,474,475 A | * | 10/1984 | Moriyama ..................... | 366/85 |
| 4,824,256 A | * | 4/1989 | Haring et al. .................. | 366/85 |
| 5,230,561 A | * | 7/1993 | Nishimi et al. ................ | 366/97 |
| 5,487,602 A | * | 1/1996 | Valsamis et al. .............. | 366/81 |
| 5,520,455 A | * | 5/1996 | Yamada et al. ................ | 366/97 |
| 6,623,156 B1 | * | 9/2003 | Meinander .................... | 366/300 |
| 2001/0050880 A1 | * | 12/2001 | Regalia ......................... | 366/84 |

FOREIGN PATENT DOCUMENTS

WO WO 99/43886 * 9/1999

* cited by examiner

*Primary Examiner*—David Sorkin
(74) *Attorney, Agent, or Firm*—Wenderoth, Lind & Ponack, L.L.P.

(57) ABSTRACT

With conventional closed kneaders, the temperature of the kneaded material remains high at the end of primary kneading because insufficient cooling is made in the interior part of the kneaded material, making it necessary to either provide cooling time between the primary and secondary kneading or to transfer materials to another kneader after the end of primary kneading for the secondary kneading. This has constituted an obstruction to productivity. In view of such problems, a closed kneader is capable of controlling the kneaded material temperature at the end of primary kneading at a level no higher than the temperature that allows addition of a vulcanizing agent line, and can perform secondary kneading immediately after the end of primary kneading. In a closed kneader provided with a chamber for storing kneaded material and a pair of rotors installed in the chamber, the proportion of the radius of the rotor shaft to the radius on the inner face of the chamber is kept at no less than 0.65.

4 Claims, 7 Drawing Sheets

CLOSED KNEADER

BACKGROUND OF THE INVENTION

The present invention concerns a closed kneader for kneading viscous materials such as plastic, rubber, etc., and more specifically the shape of the rotor shaft thereof.

An example of a conventional closed kneader is indicated in FIG. 4 and FIG. 5. In the drawings, a closed kneader 50 is composed of a kneading tank (hereinafter referred to as "chamber 3") for holding kneaded material, a pair of rotors 51, 51, which are provided at both ends with rotor drive shafts 54a, 54b (hereinafter simply referred to as 54 when generically mentioned) passing through side walls 7a, 7b of the chamber 3, and which consist of a rotor shaft 52 forming a rotor blade 53 for kneading the material kneaded in the chamber 3, and a pressure cover 8. When kneading material, the kneaded material is poured into the chamber 3 by a proper means in a state where the pressure cover 8 is opened upward (see the position of 8a in FIG. 4), the pressure cover 8 is let down (see the position of the solid line in FIG. 4), and the rotors 51 are rotatebly driven with a driving means such as a motor, etc. connected to the rotor drive shafts 54.

One of the pair of rotor drive shafts 54 may be constructed as a driven shaft by using a connecting means such as gears, etc.

In kneading work using a conventional closed kneader, the proportion of the radius of the rotor shaft Rr' against the radius on the inner face of the chamber Rc' (Rr'/Rc', also applicable hereinafter) is 0.5 or so, the proportion of the land width w' of the rotor blade 53 against the radius of the rotor shaft Rr' (w'/Rr', also applicable hereinafter) is 0.3 or so, and the clearance m' between the outer circumferential face of the rotor shaft and the wall face of the chamber is about 50% of the radius on the inner face of the chamber Rc'. This means a large clearance between the outer circumferential face of the rotor shaft and the inner wall face of the chamber, providing a thickness for the material to be mixed in the chamber.

During kneading, a lot of heat is produced within the kneaded material, in the chamber and also by the rotor shaft because of internal heat generation due to shearing and dispersion, etc. during kneading. For that reason, insufficient cooling occurs in the inner part of the kneaded material with respect to the kneading speed, i.e. the speed of heat generation, in the case of a kneaded material of large thickness and low thermal conductivity (especially rubber, etc.), even if cooling water is circulated through the chamber wall and the rotor shaft.

While sufficient cooling may be made in the kneaded material with little increase of internal temperature in a material with a small mixing volume, such a machine is inferior in productivity and therefore unrealistic as a mass production unit.

In the closed kneader, while a general kneading process is divided into a primary kneading for mixing without containing any vulcanizing agent line, and a secondary kneading for performing kneading by mixing the kneaded material which has been submitted to a certain kneading process in the primary kneading with a vulcanizing agent, the kneading material temperature must be kept no higher than a certain level (variable depending on the material) for mixing in a vulcanizing agent line.

SUMMARY OF THE INVENTION

However, with a conventional closed kneader, the temperature of the kneaded material remains high at the end of the primary kneading because insufficient cooling is made to the inner part of the kneaded material, as described previously. This makes it necessary to either provide cooling time between the primary and secondary kneading or a transfer of material to another kneader after the end of the primary kneading for the secondary kneading out of the necessity of cooling. This constituted a productivity obstruction factor.

The goal of the present invention, developed in view of such problems, is to provide a closed kneader capable of controlling the kneading material temperature at the end of the primary kneading at a level no higher than the temperature that allows addition of a vulcanizing agent line, and that can perform secondary kneading immediately after the end of the primary kneading.

To achieve the objective, the invention is firstly characterized in that the proportion of the radius of the rotor shaft to the radius on the inner face of the chamber is kept at 0.65 or greater.

The present invention constructed as above becomes larger than a conventional kneader by no less than 15% in size by keeping the proportion of the radius of the rotor shaft to the radius on the inner face of the chamber at 0.65 or more, and can reduce the temperature increase of the kneaded material to no higher than the temperature that allows the addition of a vulcanizing agent line, by expanding the cooling surface area of the rotor shaft in contact with the kneaded material.

Moreover, the invention is secondly characterized in that the proportion of the land width of the rotor blade against the radius of the rotor shaft is kept at no higher than 0.25.

The second aspect of the invention can control heat generation of the kneaded material produced on the inner wall face of the chamber and the land part of the rotor blade by keeping the proportion of the land width of the rotor blade against the radius of the rotor shaft to no higher than 0.25, and enables the securing of a wide range of tilting angles by the rotor blade, which is related to the biting and kneading performance of the kneaded material.

Furthermore, the invention is thirdly characterized in that the clearance between the outer circumferential face of the rotor shaft and the inner wall face of the chamber is kept at no more than 35% of the radius on the inner face of the chamber.

The third invention constructed as above can reduce the thickness of the kneaded material as much as possible by keeping the clearance between the outer circumferential face of the rotor shaft and the inner wall face of the chamber to no more than 35% of the radius of the inner face of the chamber, enabling sufficient cooling of the interior of the kneaded material.

DETAILED DESCRIPTION OF THE INVENTION

Figure 2:
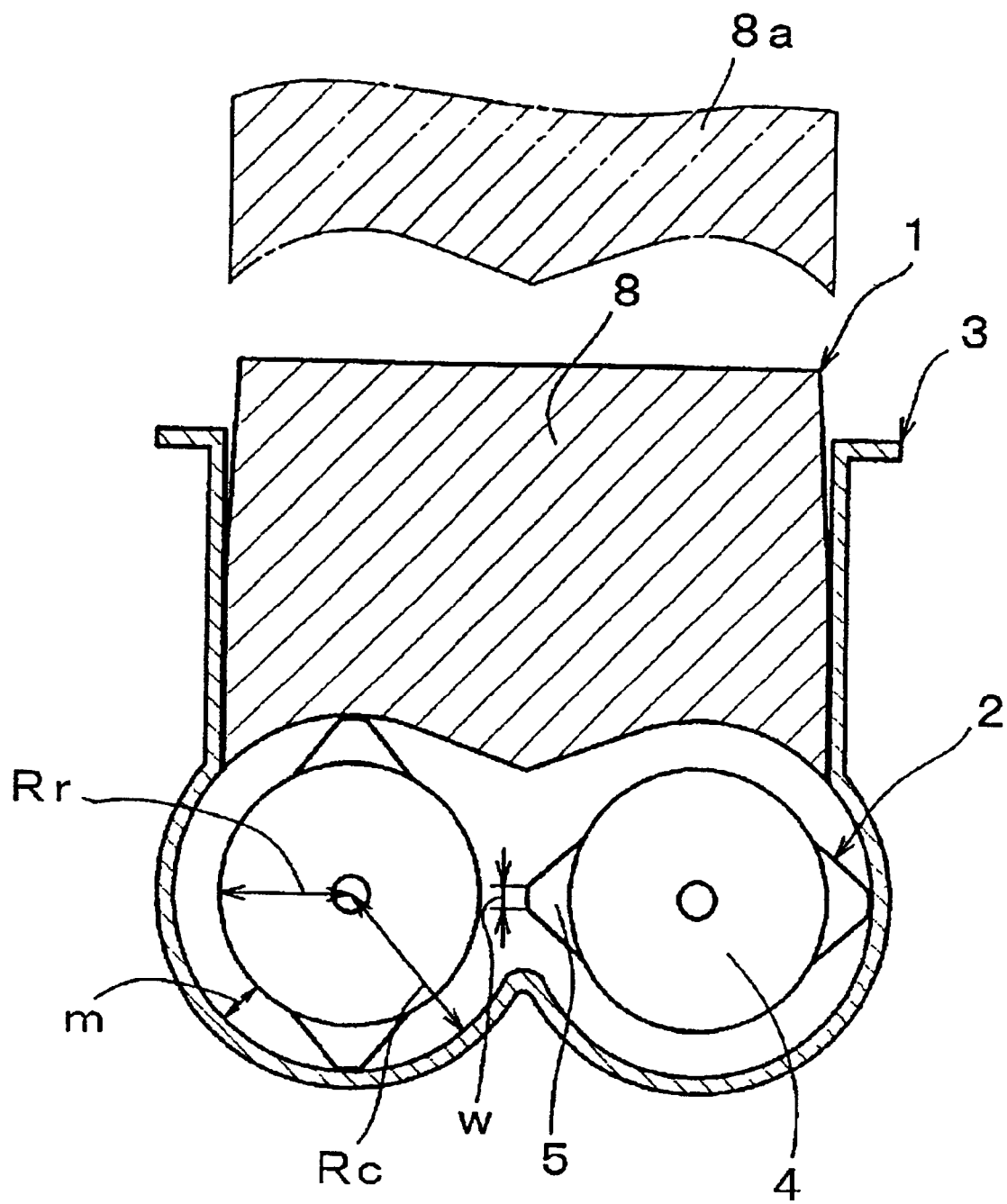
FIG. 2 is a partial sectional side view of the closed kneader according to the present invention.
Figure 3:
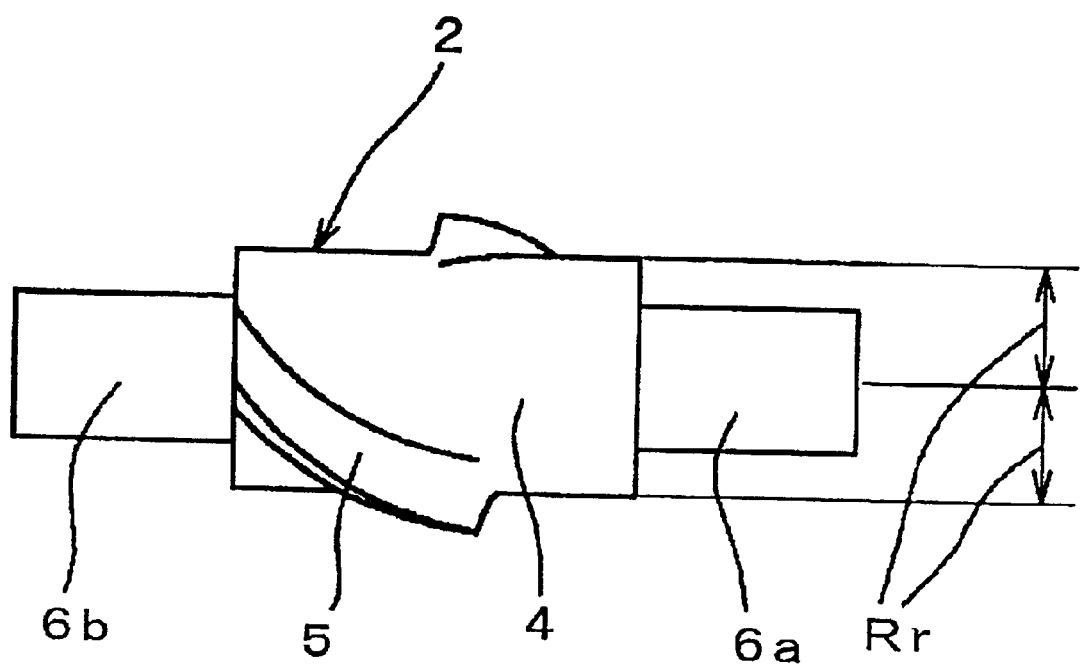
FIG. 3 is a front view of the rotor used for the closed kneader according to the present invention.
Figure 4:
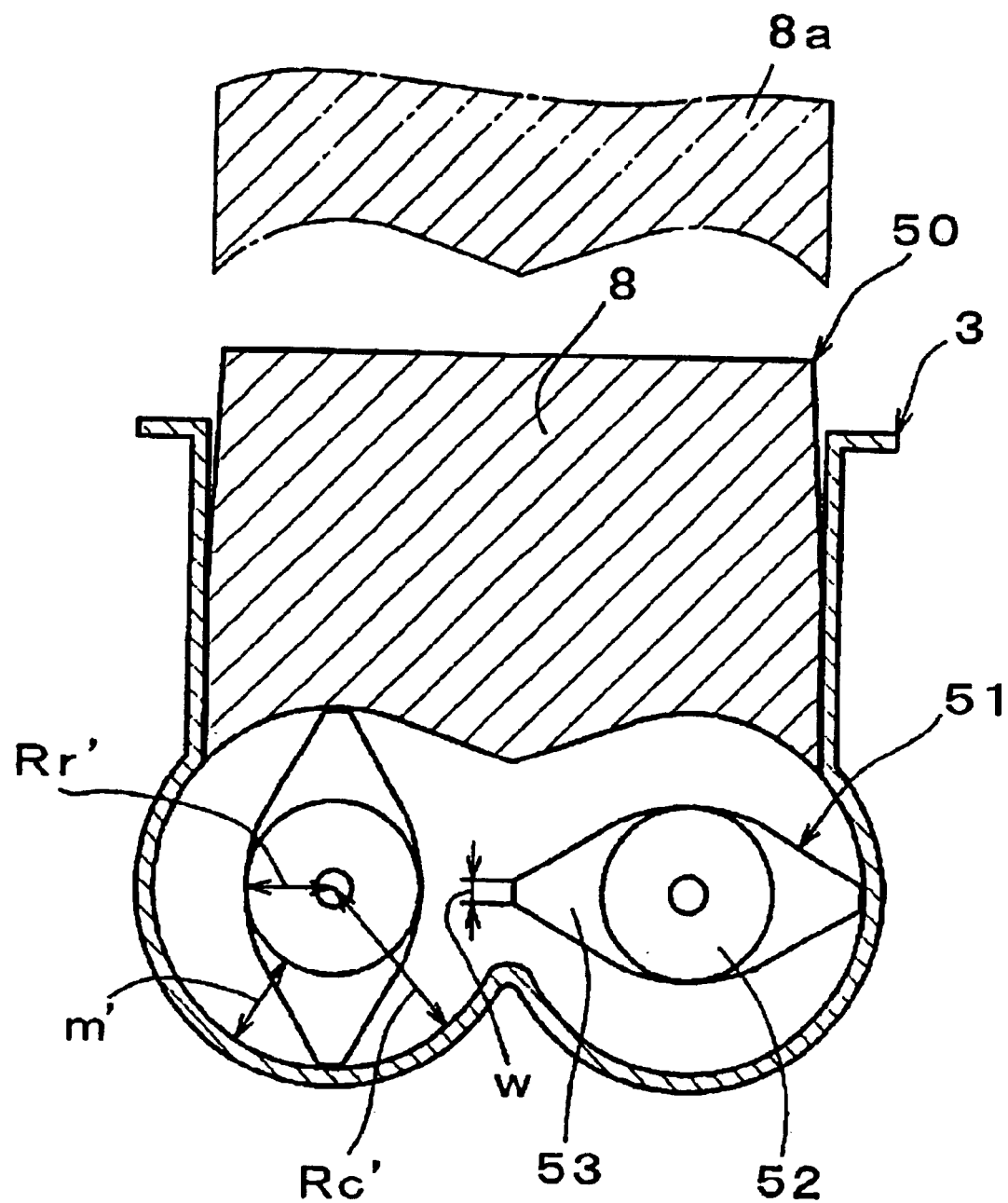
FIG. 4 is a front view of a conventional closed kneader.
Figure 5:
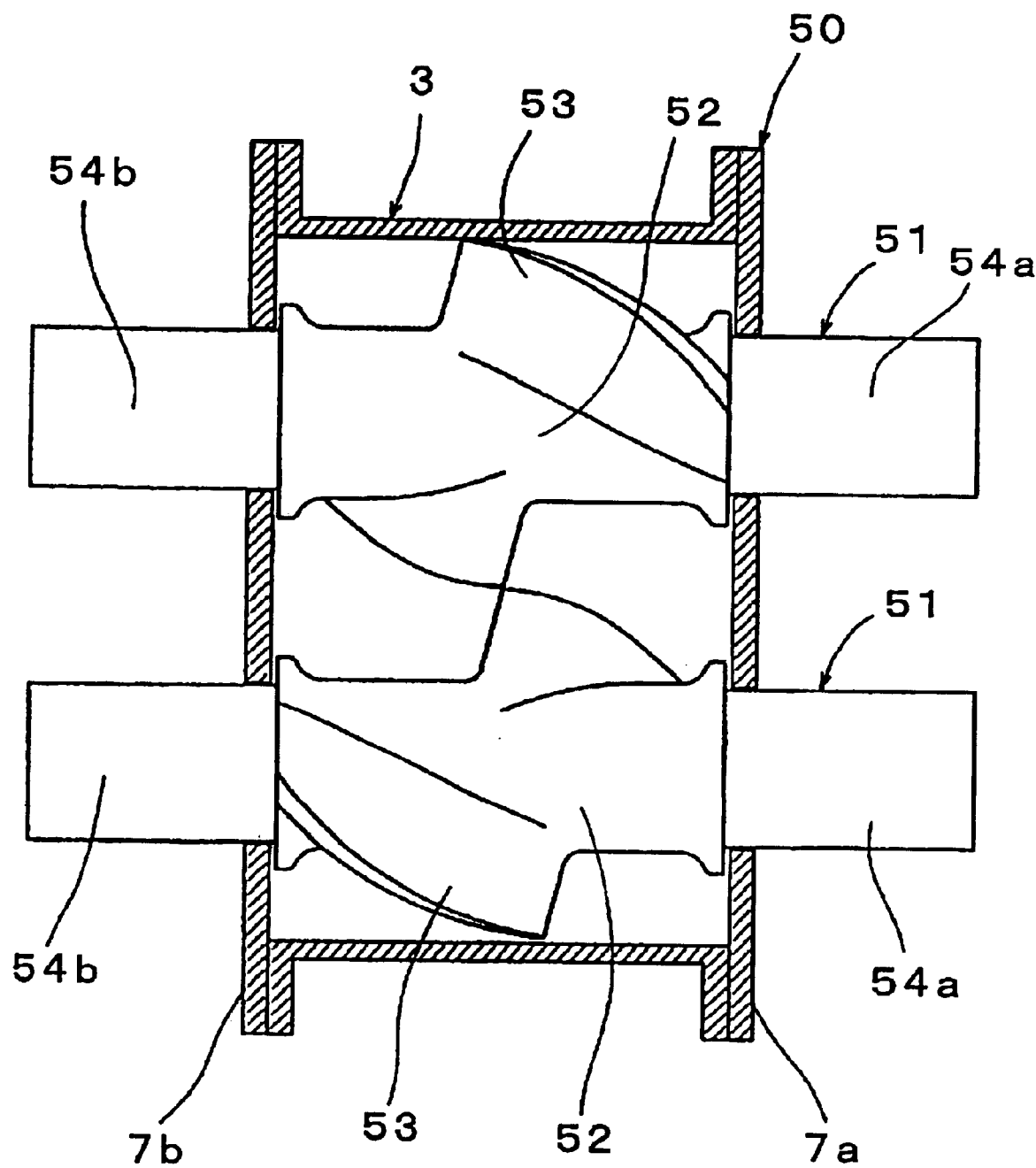
FIG. 5 is a partial sectional side view of a conventional closed kneader.

The present invention will be explained hereafter based on the embodiment indicated in FIG. 1 to FIG. 3. In the drawings, a closed kneader 1 is an example of a pressure kneader, the rotor of which is mounted tangentially. In the same way as the known mechanism (the same symbol will be used for the same structure and repeated explanation will be omitted), the present invention is comprised of a chamber 3 for storing kneaded material, a pair of rotors 2, 2, which are provided at both ends with rotor drive shafts 6a, 6b passing through side walls 7a, 7b of the chamber 3 and which consist of a rotor shaft 4 forming a rotor blade 5 for kneading the kneaded material in the chamber 3 and a pressure cover 8.

Figure 1:
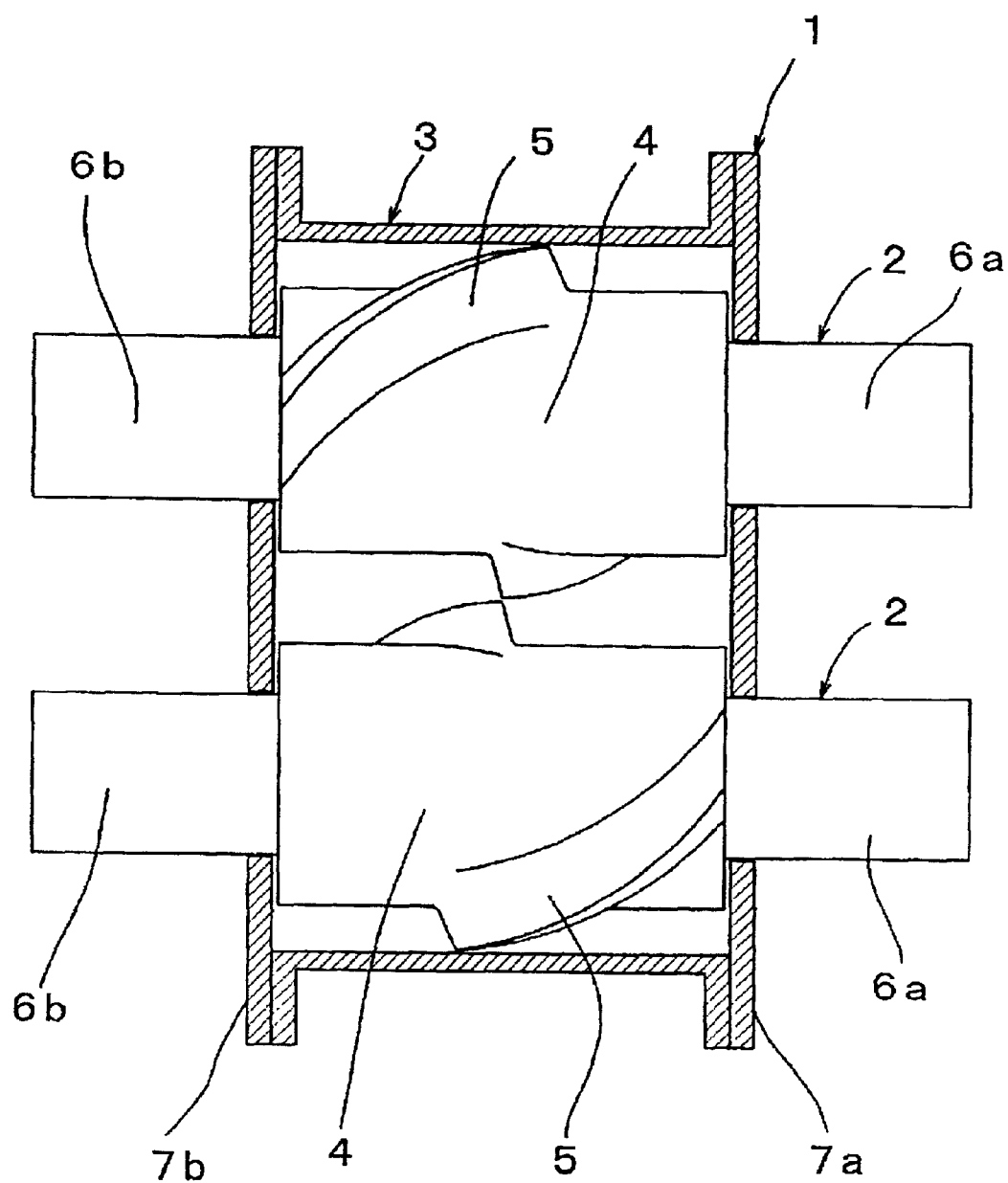
FIG. 1 is a front view of a closed kneader according to the present invention.

The rotor blades 5, 5 on the pair of rotors 2, 2 are preferably disposed tangentially in a way so as not to overlap with each other, as shown in FIG. 1.

However, the closed kneader 1 according to the present invention is realized by keeping the proportion of the radius of the rotor shaft 4 against the radius on the inner face Rc of the chamber 3 at 0.65 or more, and by also keeping the clearance m between the outer circumferential face of the rotor shaft 4 and the inner wall face of the chamber 3 at no more than 35% of the radius Rc on the inner face of the chamber.

Figure 6:
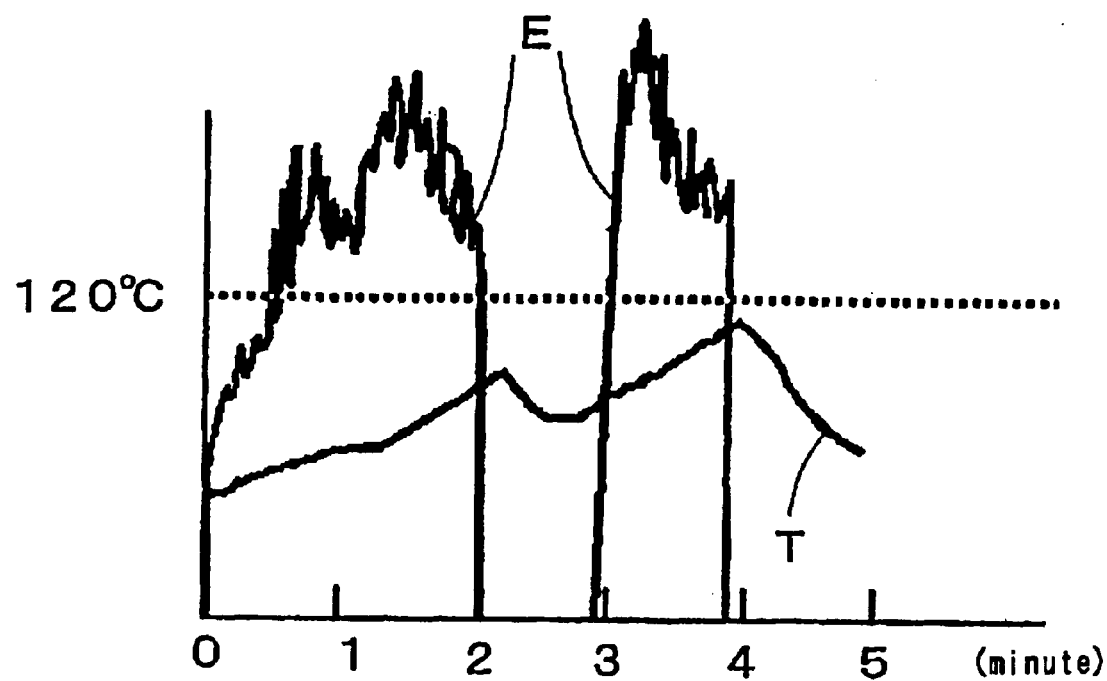
FIG. 6 is a kneading chart of primary kneading by the kneader according to the present invention.

This was determined based on experiments made for preventing a rise in kneading temperatures, and the results of these experiments are given in FIG. 6 and thereafer. These experiments were conducted by using a 55 liter class kneader.

Figure 7:
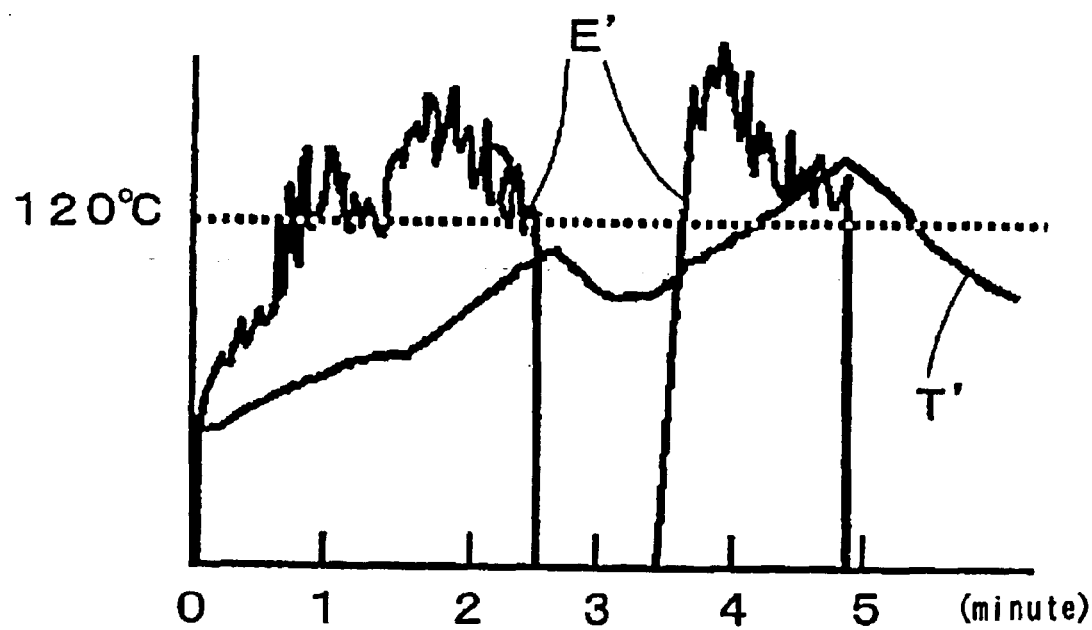
FIG. 7 is a kneading chart of primary kneading by the conventional kneader.

FIG. 6 shows a primary kneading chart from a kneader according to the present invention, while FIG. 7 shows a primary kneading chart from a conventional kneader, prepared by plotting time on the x-axis, and giving, on the y-axis, electric power values with E, E' and kneaded material temperatures with T, T'. The reason why there is an interval in which the electric power becomes 0 along the way is the necessity of either supplementing the kneaded material or injecting chemicals by stopping the rotation of the rotor during primary kneading.

As is apparent from FIG. 7, with a conventional kneader, the maximum temperature of the material exceeds 120° C. during primary kneading, deviating from a range of 100 to 120° C., which is a temperature range enabling addition of a vulcanizing agent line, and making it necessary to provide a certain cooling process before performing secondary kneading. With the kneader according to the present invention however, there is no case in which the maximum temperature of the material exceeds 120° C. during primary kneading, as shown in FIG. 6, and it thus becomes unnecessary to have any cooling process prior to the secondary kneading.

Figure 8:
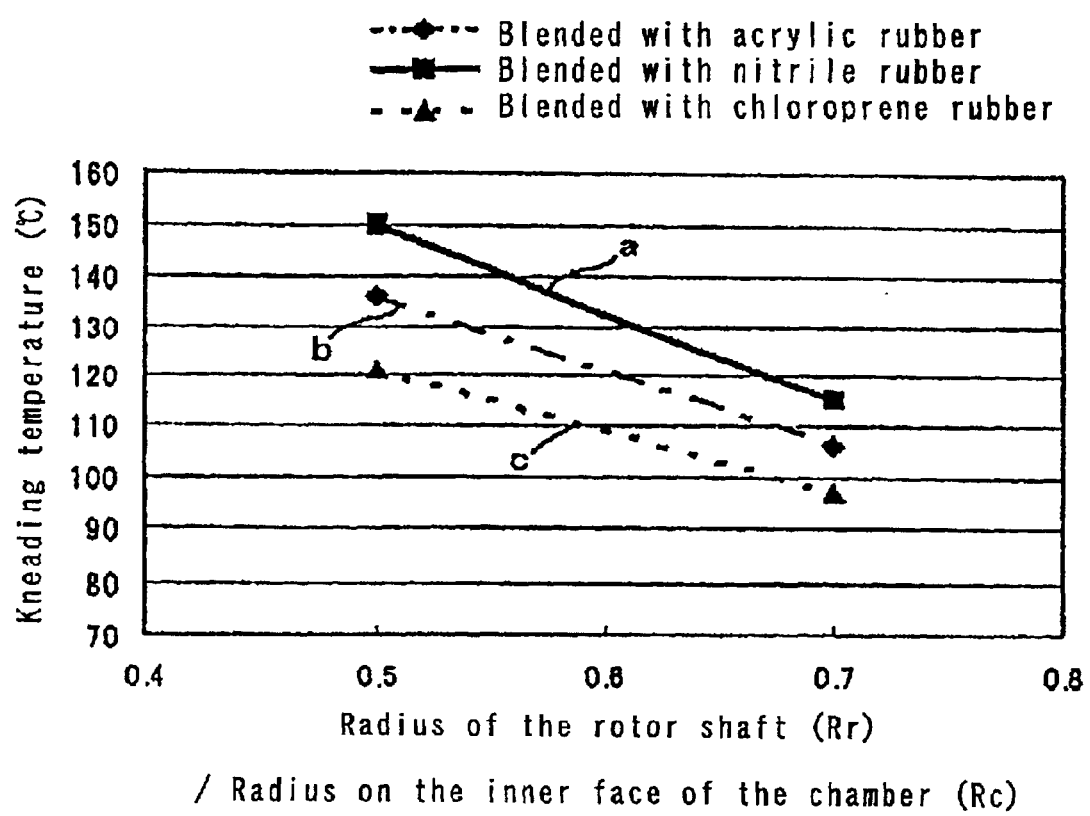
FIG. 8 is a graph showing the relationship between the proportion of the radius of the rotor shaft against the radius on the inner face of the chamber and the kneading temperature.

FIG. 8 shows the relationship between the proportion of the radius Rr of the rotor shaft against the radius Rc on the inner face of the chamber and the kneading temperature. "a" indicates a material blended with acrylic rubber, "b" a material blended with nitrile rubber, and "c" a material blended with chloroprene rubber, respectively. As is apparent from FIG. 8, as the proportion of the radius Rr of the rotor shaft against the radius Rc on the inner face of the chamber comes closer to 1, in other words, as the clearance "m" between the inner wall of the chamber and the rotor shaft becomes smaller, the thickness of the kneaded material diminishes, and the kneaded materials' temperature drops.

On the other hand, while producing the effect of lowering kneaded material temperature, as the clearance "m" becomes smaller, the volume of the kneading material to be mixed also becomes smaller, leading to inferior productivity of the machine as a mass production unit.

As a result of those experiments, the inventors set the proportion of the radius Rr of the rotor shaft against the radius Rc on the inner face of the chamber at 0.65 or over (preferably 0.7 or over), which is a value capable of controlling the maximum kneaded material temperature at the end of primary kneading at a level no higher than at the temperature that allows addition of a vulcanizing agent line, for maintaining a sufficient production volume of the machine as a mass production unit and, from the same point of view as above, keeps the clearance "m" between the outer circumferential face of the rotor shaft and the inner wall face of the chamber of the radius Rc on the inner face of the chamber at no more than 35% (preferably no more than 30%).

Furthermore, the proportion of the land width "w" of the rotor blade 5 against the radius of the rotor shaft Rr was set for no more than 0.25 (preferably no more than 0.2), for controlling generation of heat produced at the land portion of the rotor blade 5 and for securing a wide range of tilting angles by the rotor blade 5.

In construction, in the mixing of the kneaded material, it becomes possible to perform a secondary kneading following the first kneading, by rotatably driving the rotor 2, after introduction of the kneaded material, the same way as it has conventionally been practiced.

As described above, according to the present invention, it is possible to control kneaded material of a small thickness during the kneading and cool it sufficiently. This enables keeping of the temperature of the kneaded material at the end of the primary kneading at a level no higher than the temperature that allows addition of a vulcanizing agent line, and to therefore perform secondary kneading immediately after the end of the primary kneading.

Moreover, since the proportion of the land width of the rotor blade against the radius of the rotor shaft was set to no more than 0.25, the present invention has such effects as controlling generation of heat produced on the inner wall face of the chamber and at the land part of the rotor blade, securing a wide range of tilting angles by the rotor blade, which is related to the biting performance and kneading performance of the kneaded material, etc.

Furthermore, since the clearance between the outer circumferential face of the rotor shaft and the inner wall face of the chamber was kept at no more than 35% of the radius on the inner face of the chamber, the present invention has such effects as enabling sufficient cooling of the interior of the kneaded material.

What is claimed is:

1. A closed kneader comprising:
    a chamber for storing kneaded material;
    a pressurizing lid for closing a top of said chamber; and
    a pair of rotors installed in said chamber so as to oppose each other, each of said rotors comprising:
        a rotor shaft, and
        a rotor blade extending over a range on said rotor shaft from an end part on each of opposite sides of said rotor shaft to about a center of said rotor shaft;

wherein said rotor blade of each of said pair of rotors is tangentially mounted so as not to overlap one another; and wherein a ratio of a rotor shaft radius to a radius of an inner face of said chamber is at least 0.65, a clearance between an outer circumferential face of said rotor shaft and an inner wall face of said chamber is no more than 35% of the radius of the inner face of said chamber, and a ratio of a land width of each said rotor blade to the rotor shaft radius is no more than 0.25.

2. A closed kneader comprising:

a kneader chamber having an open top and inner wall surfaces forming rotor receiving spaces in said kneader chamber;

a pressurizing cover to close said open top of said kneader chamber;

a first rotor comprising a rotor shaft having a rotor blade thereon, said first rotor being disposed in said kneader chamber and having a rotor shaft radius, and said rotor blade having a radially outer land thereon; and a second rotor comprising a rotor shaft having a rotor blade thereon, said second rotor being disposed in said kneader chamber adjacent to said first rotor and having a rotor shaft radius, and said rotor blade having a radially outer land thereon;

wherein said rotor shaft radius of each of said first rotor and said second rotor has a ratio to a radius of one of said inner wall surfaces forming said rotor receiving spaces that is at least 0.65;

wherein a clearance between an outer circumferential face of each said rotor shaft and said inner wall faces of said chamber is no more than 35% of the radius of said inner wall faces of said chamber; and wherein a ratio of a width of said land of said rotor blade of each of said first rotor and said second rotor to the rotor shaft radius is no more than 0.25.

3. The closed kneader of claim 2, wherein a circle defined by rotation of said rotor blade of said first rotor does not intersect with a circle defined by rotation of said rotor blade of said second rotor as seen in a direction along each said rotor shaft.

4. The closed kneader of claim 2, wherein said rotor blade of each of said first and second rotors comprises a first blade part that is axially and circumferentially spaced from a second blade part.

* * * * *